United States Patent Office 3,598,682
Patented Aug. 10, 1971

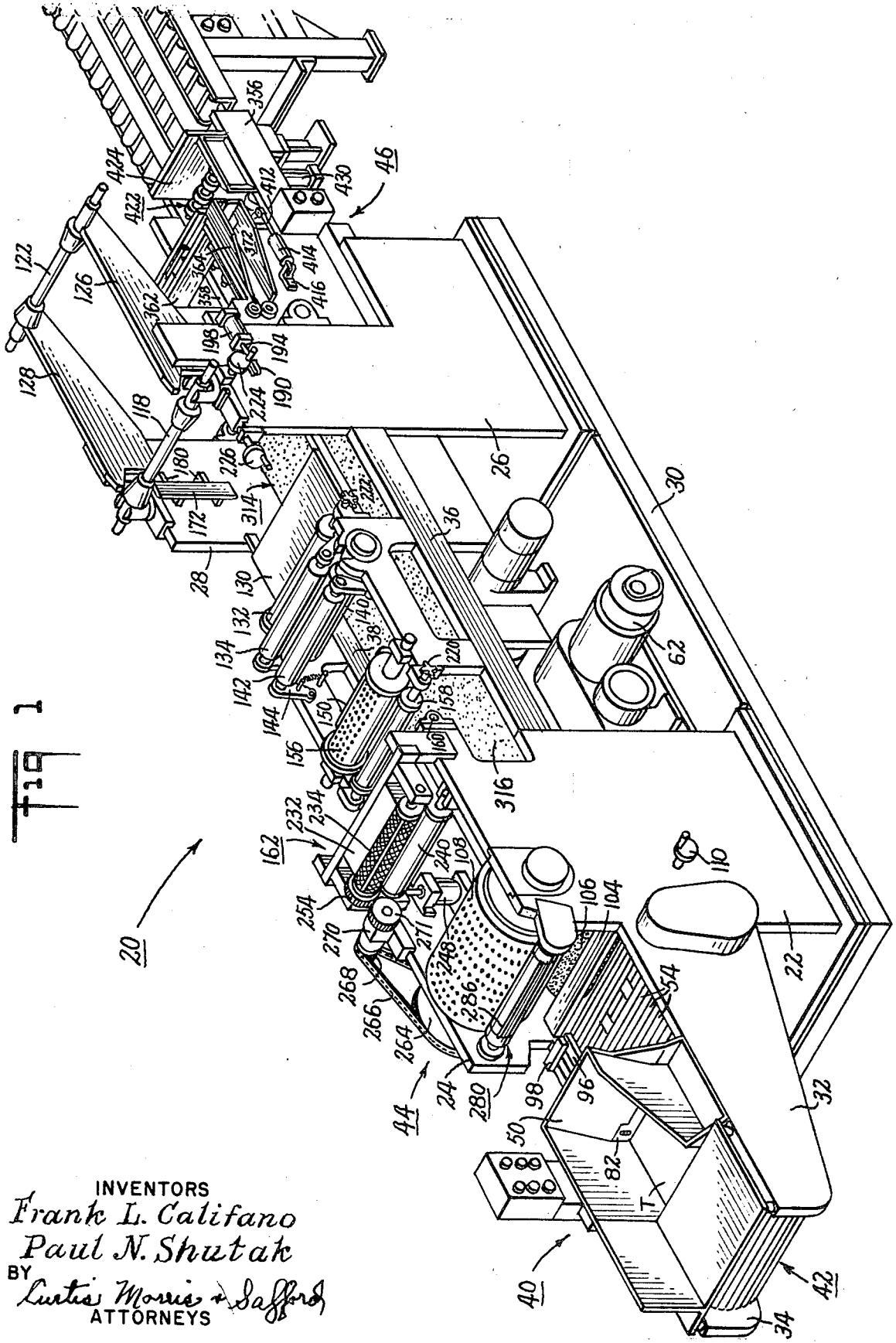

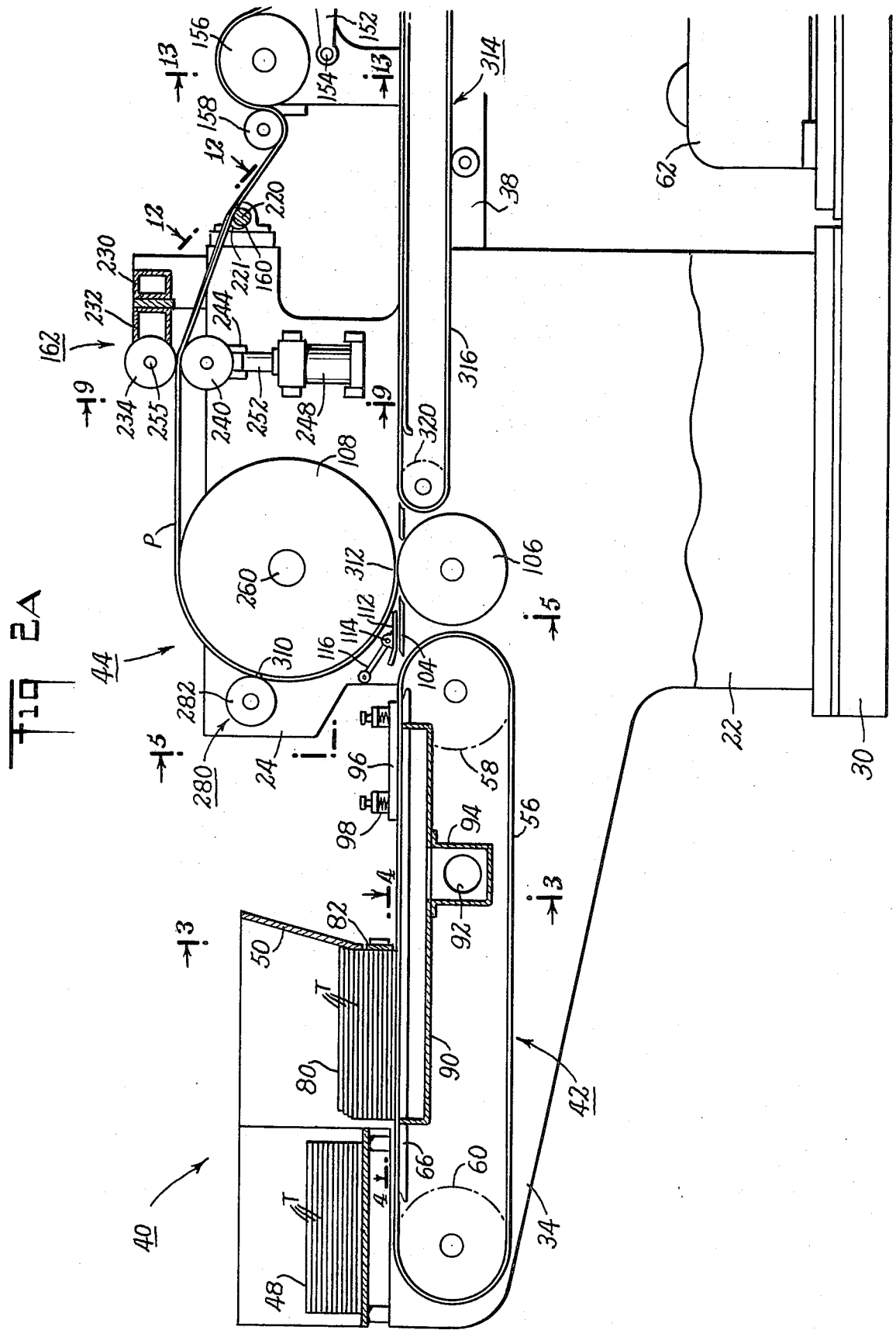

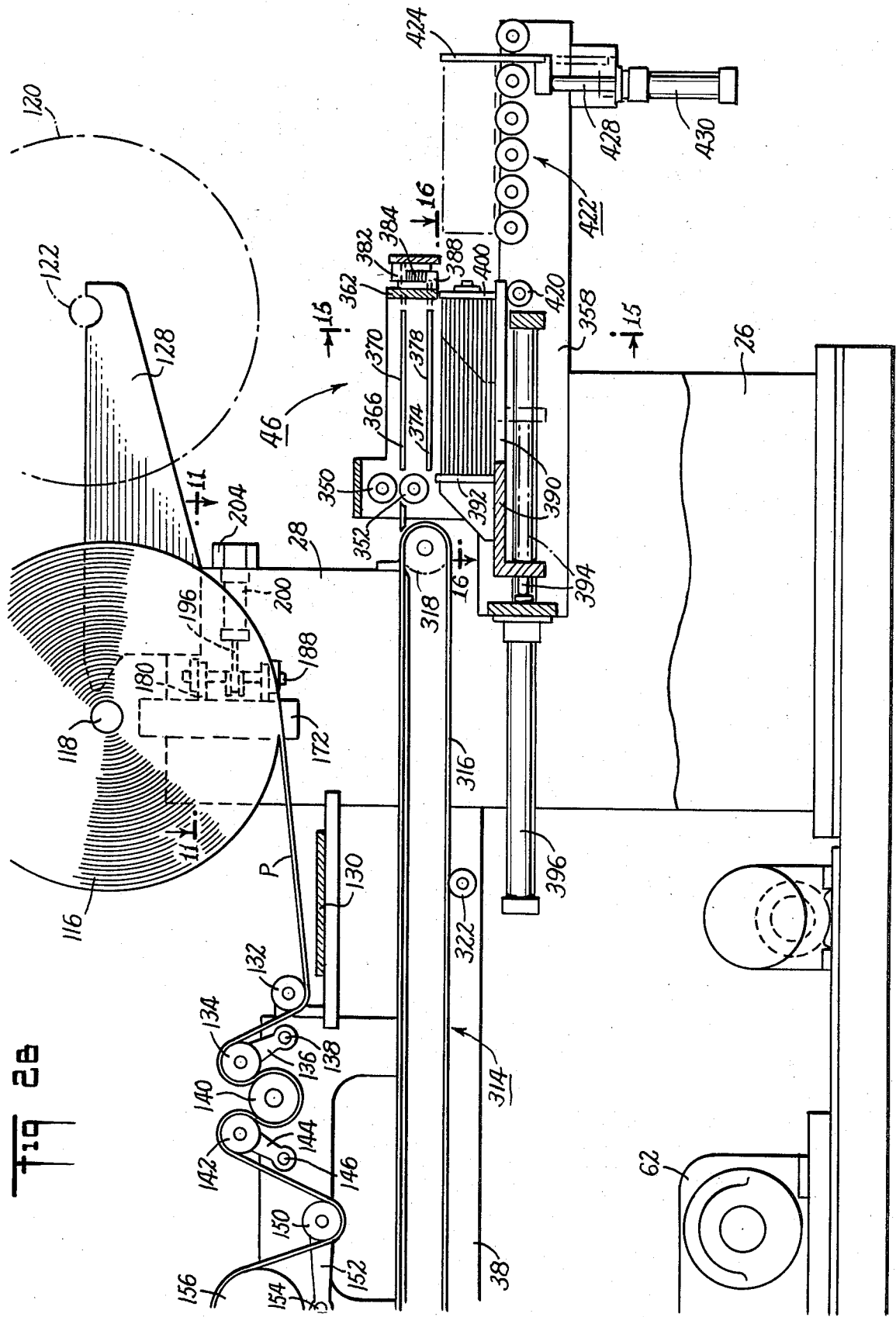

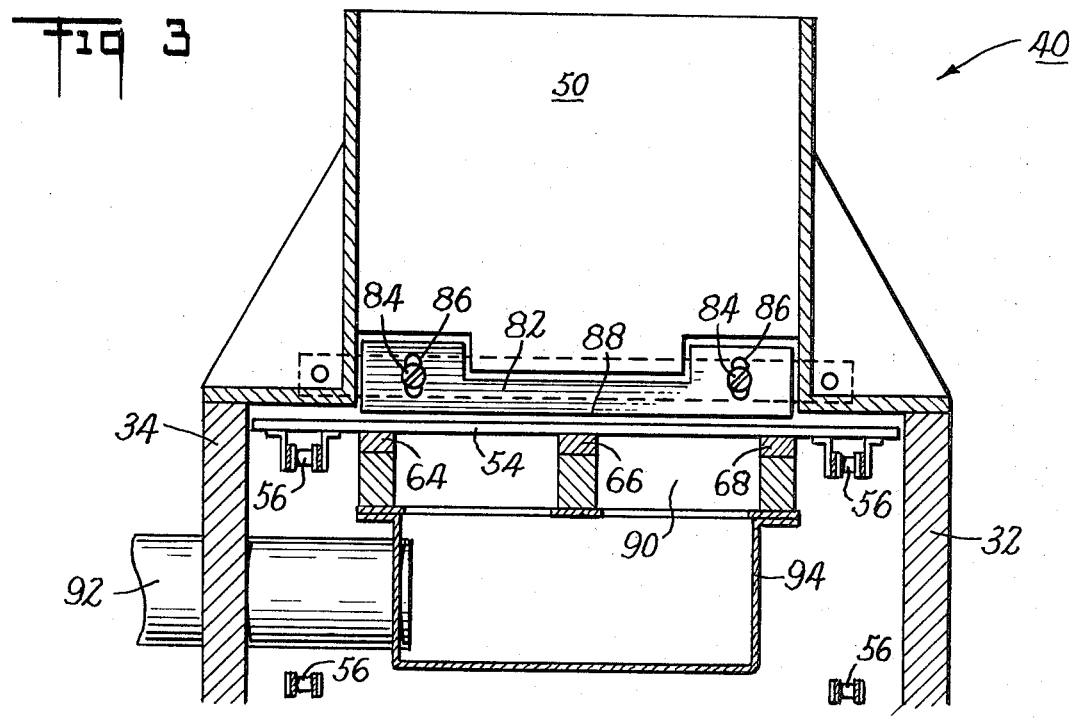
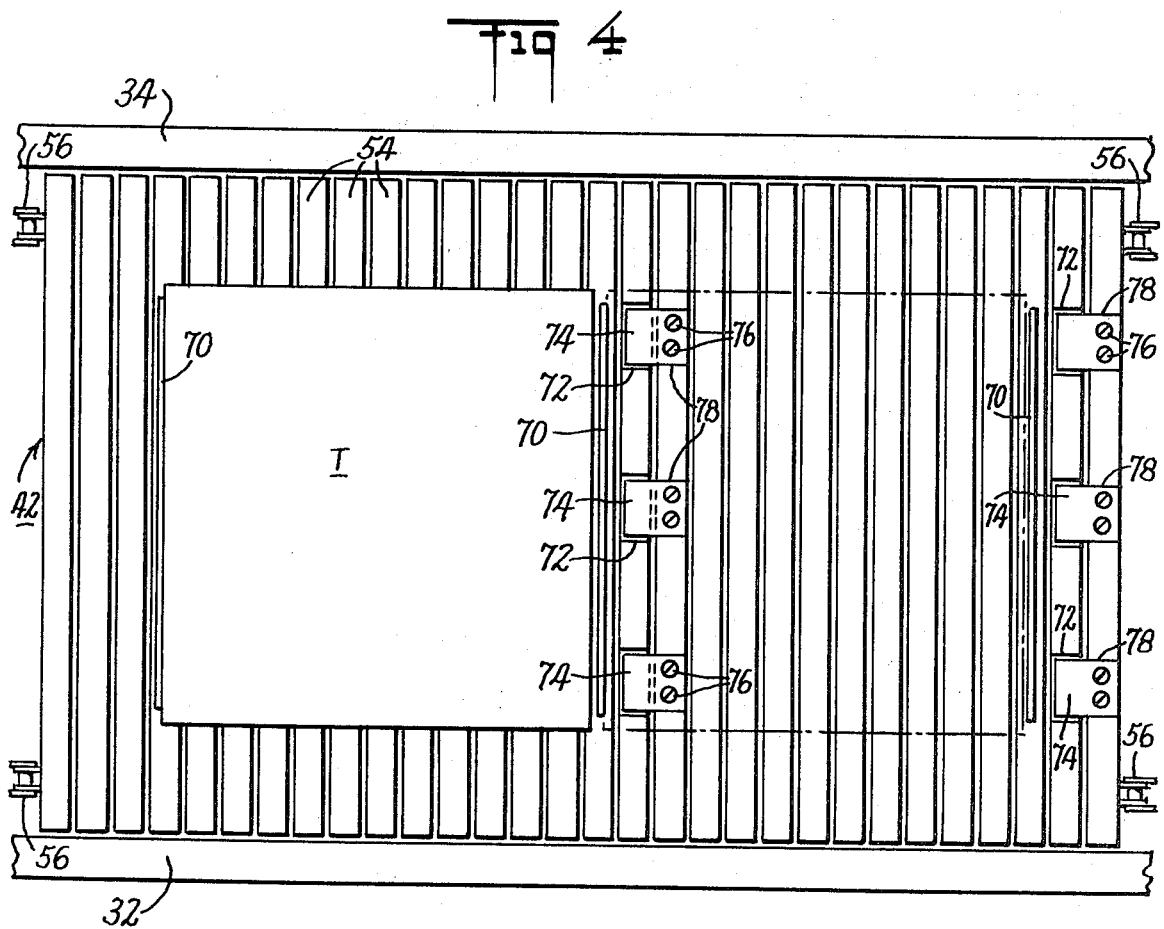

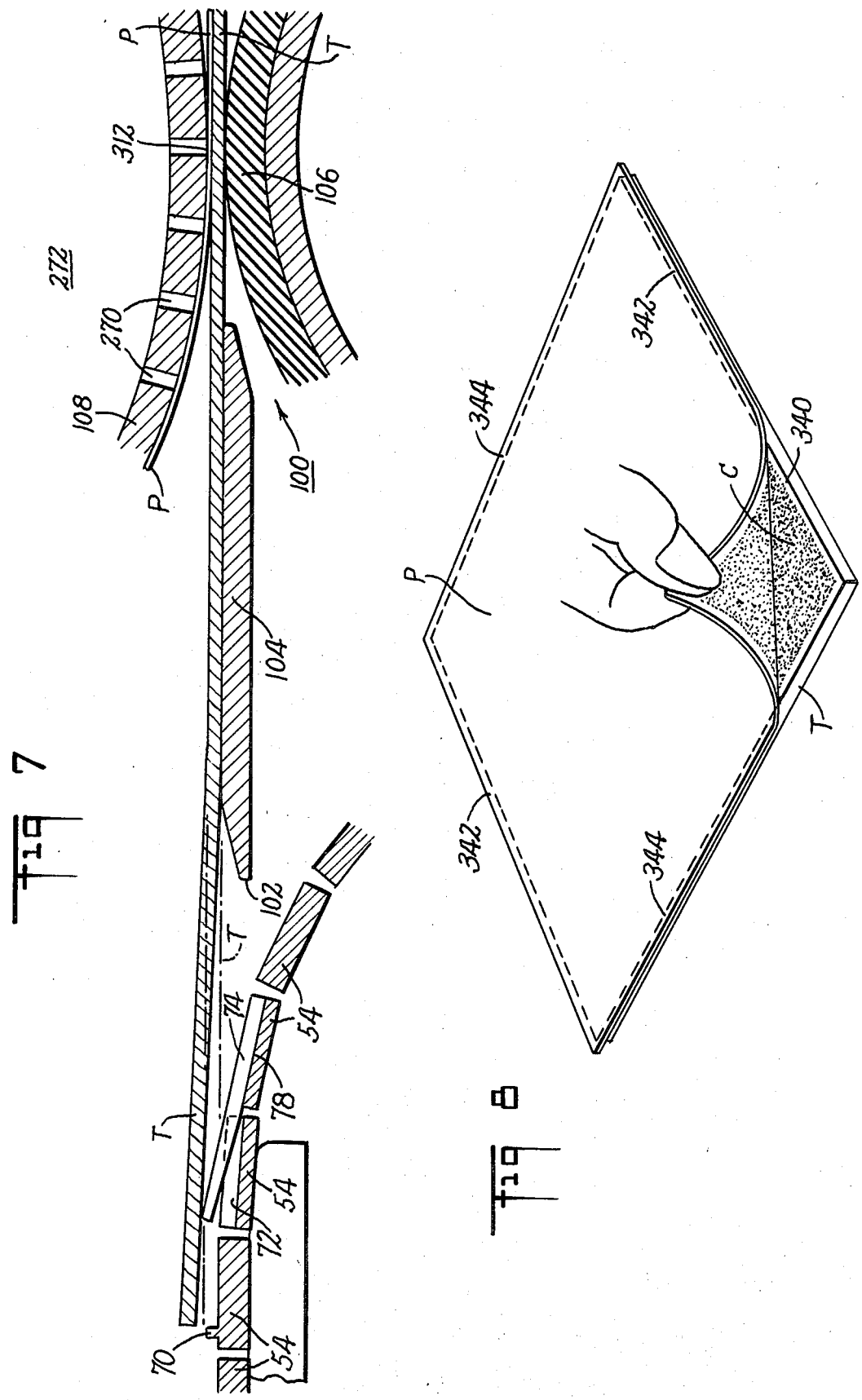

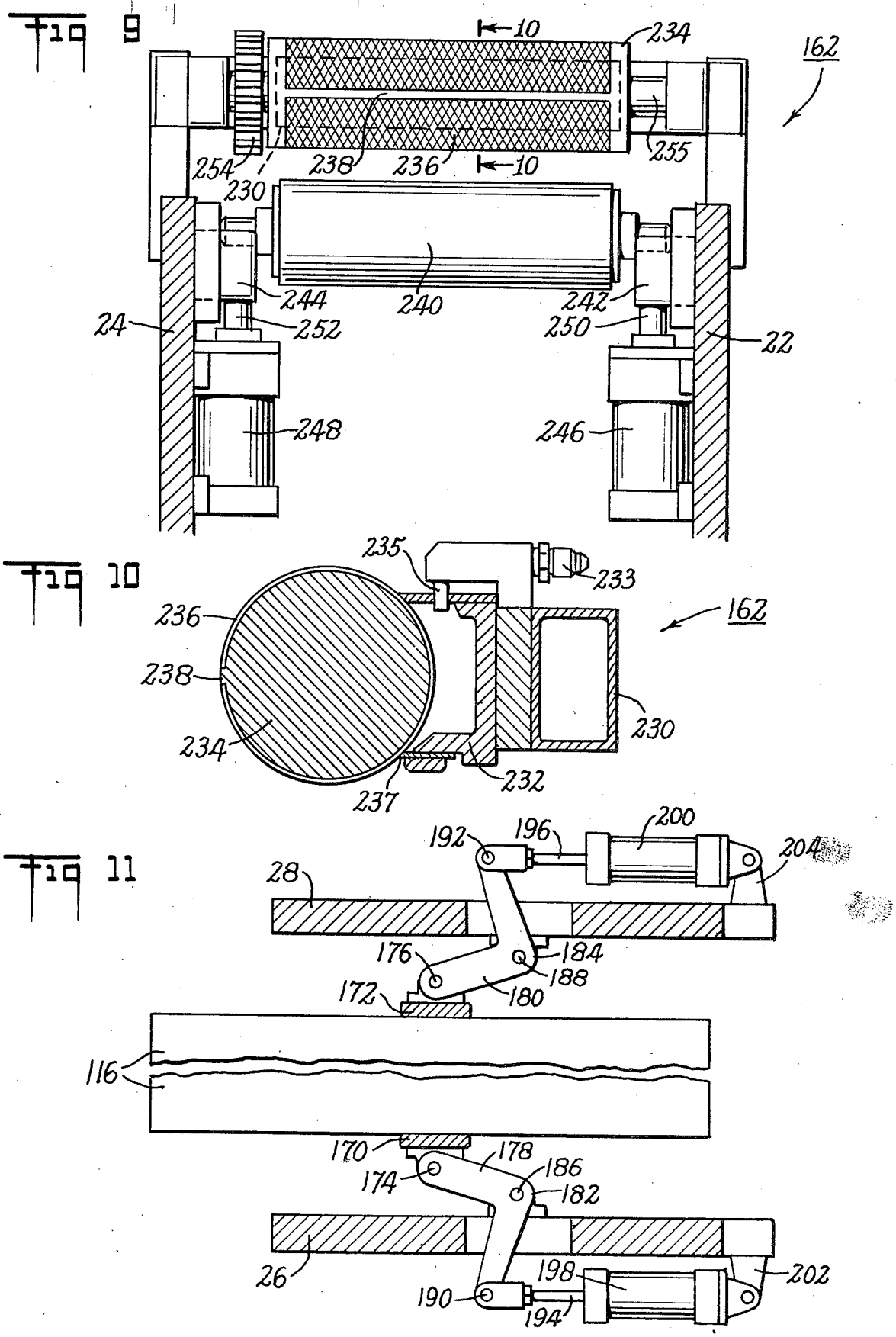

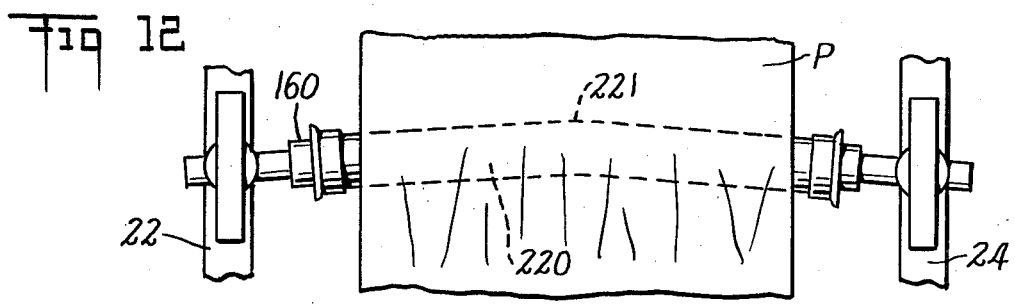
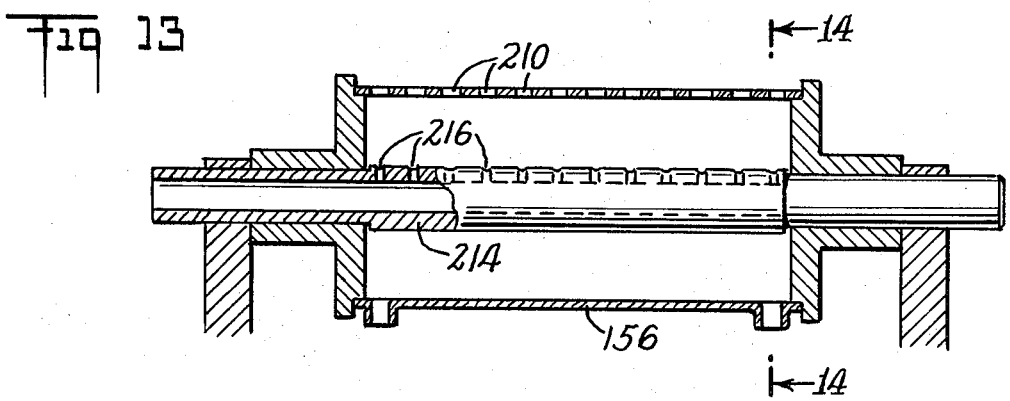
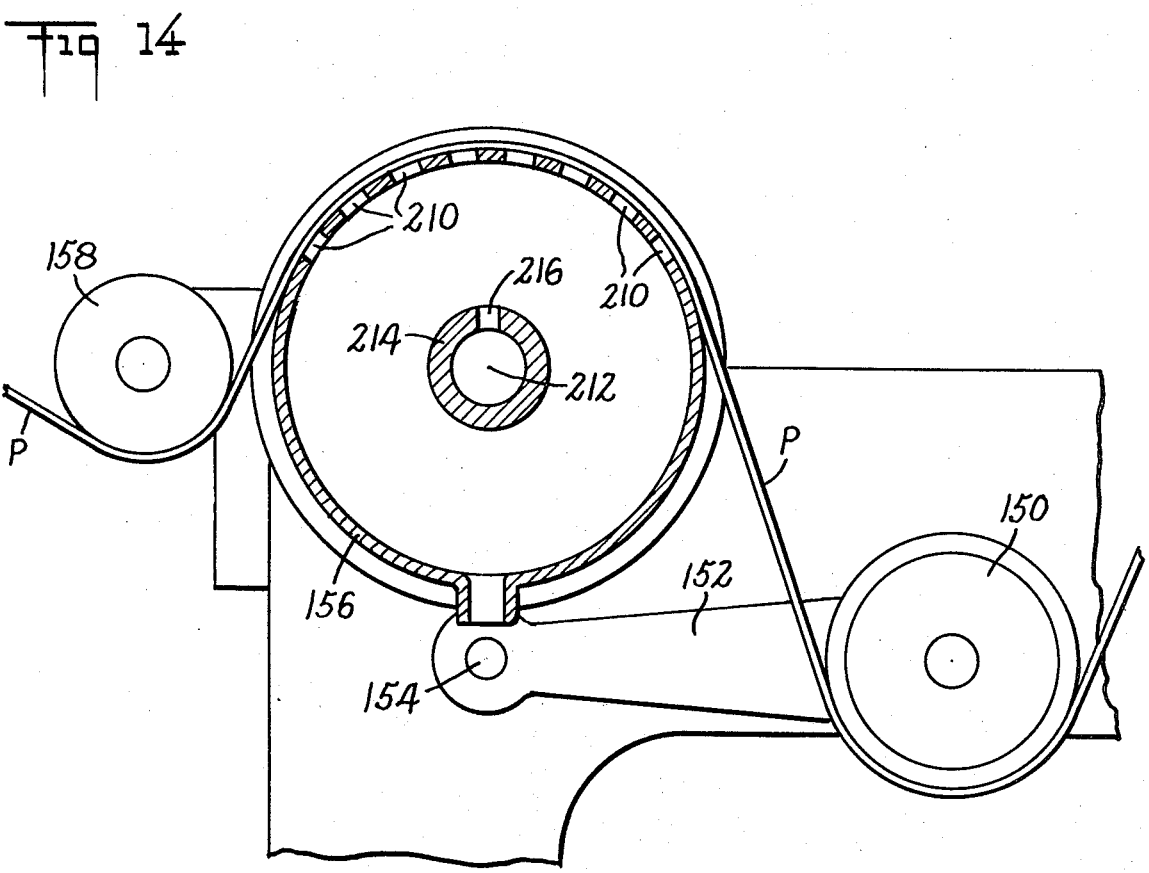

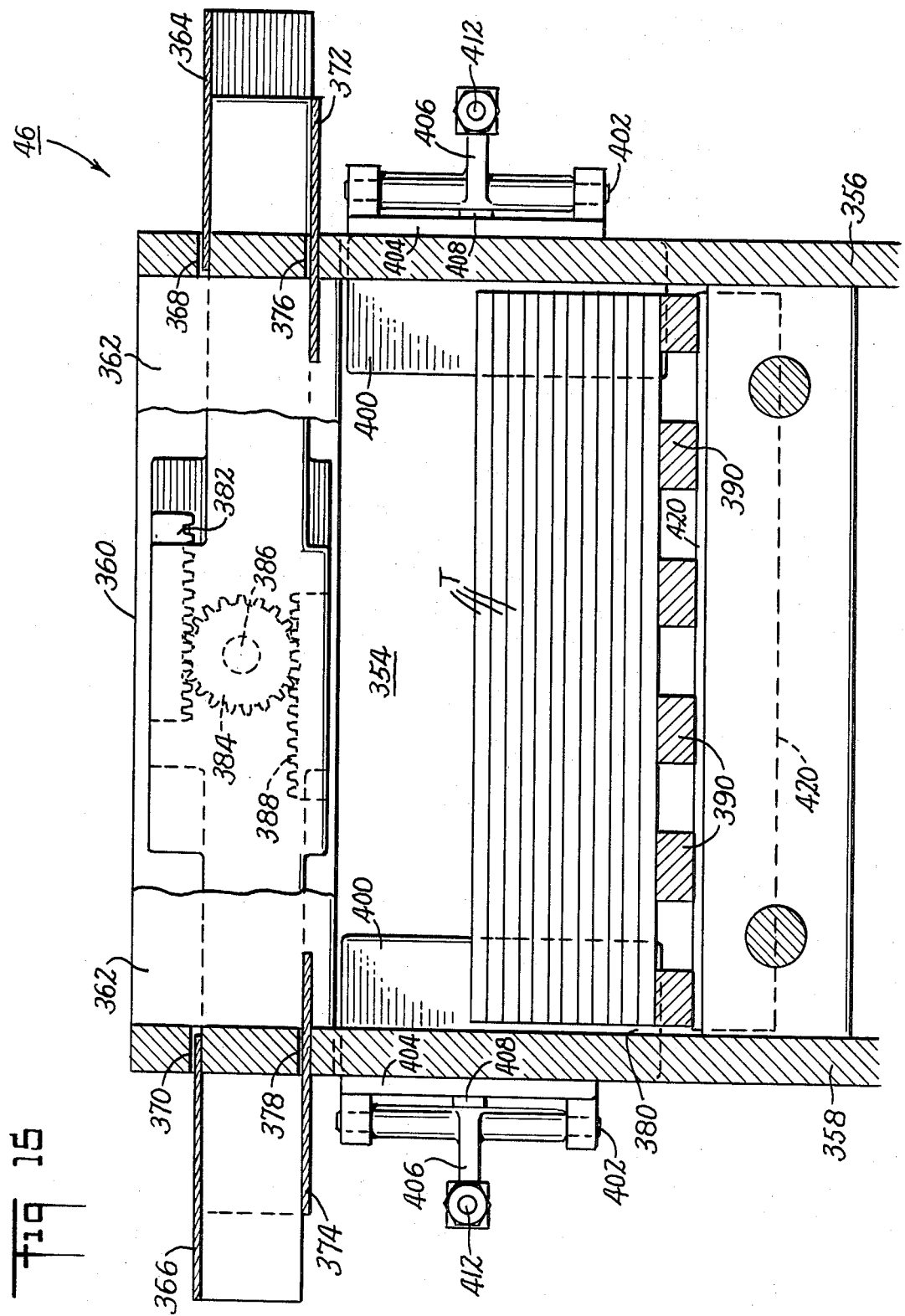

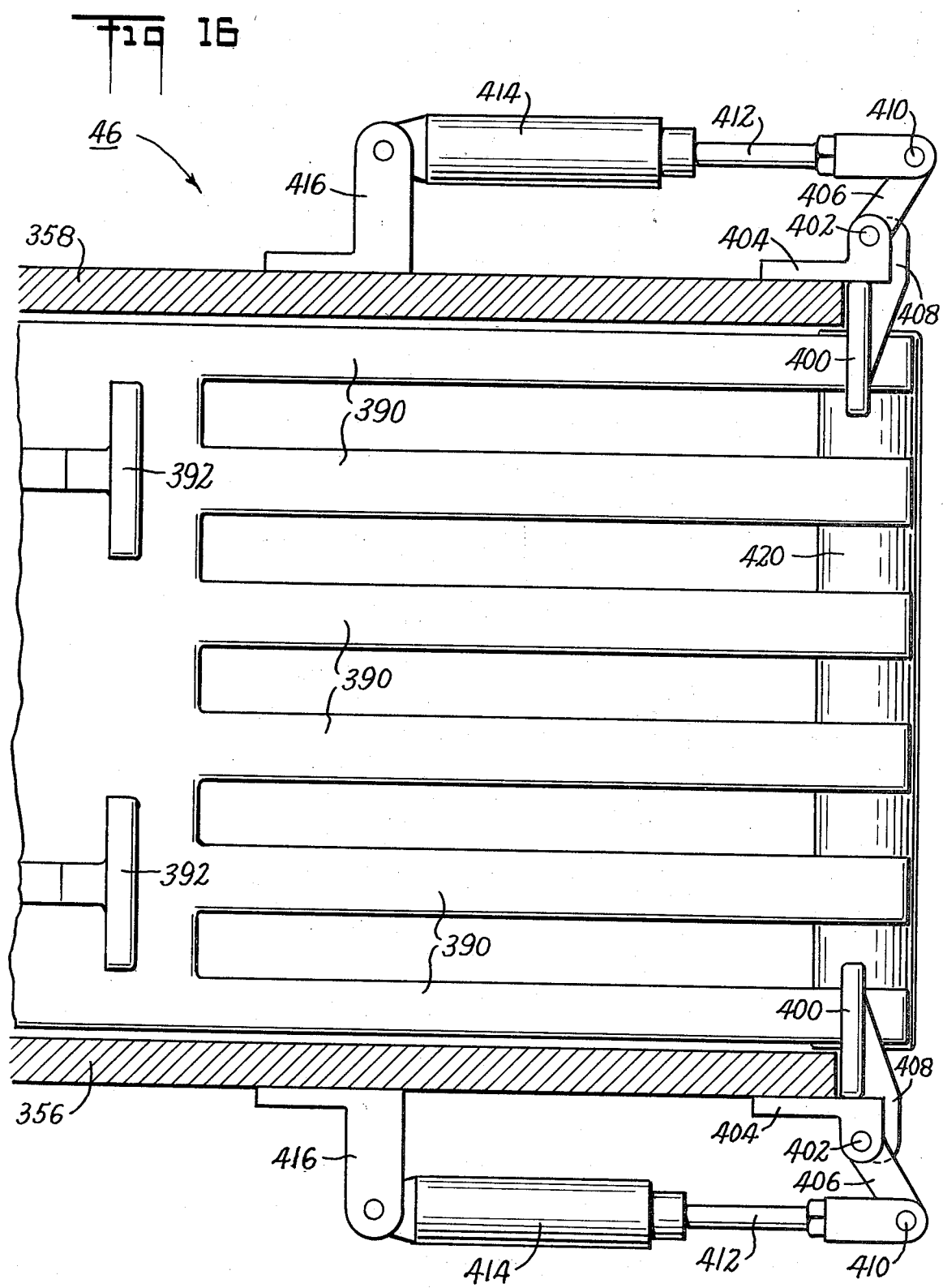

3,598,682
METHOD AND APPARATUS FOR MAKING TILE PRODUCTS
Frank L. Califano, Hackensack, and Paul N. Shutak, Madison, N.J., assignors to The Flintkote Company, White Plains, N.Y.
Filed Jan. 27, 1969, Ser. No. 794,286
Int. Cl. B32b 31/18
U.S. Cl. 156—521                                    14 Claims

ABSTRACT OF THE DISCLOSURE

Tile products from a vertically aligned stack are moved by a continuously moving product conveyor into an adhesive coating and paper covering apparatus. There, adhesive is first applied in a controlled pattern to a portion of paper from a continuous roll and the adhesive-coated paper is then cut to size and applied to the tile. The final product comprises a tile upon which has been deposited and bonded an adhesive coating in a predetermined controlled pattern and covered with a protective sheet of paper which then can be peeled away when the tile is installed.

---

This invention relates to tile products such as tile products commonly referred to as "floor tiles" and more in particular to floor tiles having an adhesive coating bonded thereon with a protective sheet over the adhesive coating and a method and apparatus for preparing such products.

In the past, conventional practice for laying floor tiles has required that the floor surface first be initially prepared by spreading a layer of adhesive over a relatively large floor area and then individually placing tiles on the adhesive layer in the desired pattern. While this procedure is apparently a seemingly simple operation, it requires considerable skill in applying the adhesive coating in such a manner so that the thickness of the coating is sufficient to form a permanent bond between the floor tile and the floor area and yet not too thick so that subsequent to the laying of the tile there is an oozing or "bleeding" of adhesive material up through the spaces between the tiles. Thus, while it is relatively easy for professional floor tile installers to lay tiles in this manner, it is exceedingly difficult for the casual or "do-it-yourself homeowner" to lay floor tile in a professional and workmanlike manner.

One solution that has been proposed for the problem of "non-professionals" laying floor tiles has been specially prepared tiles which have an adhesive coating bonded to the back side and the adhesive is then covered by a protective paper sheet. These tiles are commonly known as "peel and stick" floor tiles and are installed by peeling away the protective sheet and laying the tile on the floor adhesive side down. Heretofore, tiles prepared in this manner have suffered from the undesirable characteristic of "bleeding," that is adhesive oozing through the cracks of adjacent tiles after installation. This effect is due to the manner in which the adhesive is applied to the tile.

In the commonly assigned and copending application of Frank L. Califano and Joseph Laszlo, U.S. Ser. No. 528,569, filed Feb. 18, 1966, a method, apparatus and tile product are disclosed which obviates the aforementioned disadvantages of the prior art. In that application, a tile preparation apparatus is disclosed utilizing a continuous web of paper which is coated with a liquid adhesive or a dried adhesive patch in a discrete pattern. The continuous web of adhesive coated paper is then directed so as to move in line with a succession of moving tile products, pressed into contact with the tile products and then severed by a cutting knife positioned below the surface of the continuously moving tiles. The tiles are fed mechanically and the paper is delivered under a tension feed.

The present invention is an improvement over the apparatus and method described in the aforementioned Califano et al. application and utilizes a tension feed of paper from a continuous roll to a hot melt adhesive application station where adhesive in the desired pattern is applied to one side of the paper. The paper is then fed to a vacuum laminating roll where the paper is firmly held against the roll by a vacuum while the paper is cut into discrete segments of a size to fit over a tile product being processed. The discrete segments of adhesive coated paper are then brought into registry with a succession of moving tile products and the adhesive coated paper is bonded thereto. The tiles are driven to the laminating roll by a mechanical conveyor including a suction box therebelow to insure that the tiles are maintained flat against the conveyor. After the paper has been bonded to the tiles, the tiles are transferred to a pneumatically operated stacker to be packaged.

One of the objects of the present invention is to produce a tile having an adhesive layer on its rear surface which is set back from the tile edges to preclude "bleeding" and having a protective sheet positioned over the adhesive which is easy to remove when the tile is ready to be installed.

Another object of this invention is to provide a method and apparatus to produce a pressure-sensitive, adhesive-coated tile wherein the adhesive is applied within a predetermined confined area on the rear of the tile surface.

It is a still further object of this invention to provide a method and apparatus to produce tiles of the character described in a rapid, economical and commercially feasible manner.

Further objects, details and advantages will become apparent from the following detailed description when considered in conjunction with the accompanying drawings wherein:

FIG. 1 is an overall, perspective view of the apparatus of the present invention;

FIG. 2A is a vertical, sectional view of the left half, as viewed in FIG. 1, of the apparatus of the present invention;

FIG. 2B is a vertical, sectional view of the right half, as viewed in FIG. 1, of the apparatus of the present invention;

FIG. 3 is a vertical, sectional view taken on line 3—3 of FIG. 2A showing the tile feed;

FIG. 4 is a plan view taken on line 4—4 of FIG. 2A showing the tile conveyor;

FIG. 7 is a vertical, sectional view taken on line 7—7 of FIG. 5 showing the tile transfer from the initial conveyor to the adhesive application roll;

FIG. 8 is a perspective view of a finished tile product prepared according to the principles of the present invention;

FIG. 9 is a vertical, sectional view taken on line 9—9 of FIG. 2A showing the adhesive application station;

FIG. 10 is a vertical, sectional view taken on line 10—10 of FIG. 9;

FIG. 11 is a horizontal, sectional view taken on line 11—11 of FIG. 2B showing the paper feed roll and brake shoes;

FIG. 12 is a plan view taken on line 12—12 of FIG. 2A showing the paper tensioning roll;

FIG. 13 is a vertical, sectional view taken on line 13—13 of FIG. 2A;

FIG. 14 is a vertical, sectional view taken on line

Figure 5:
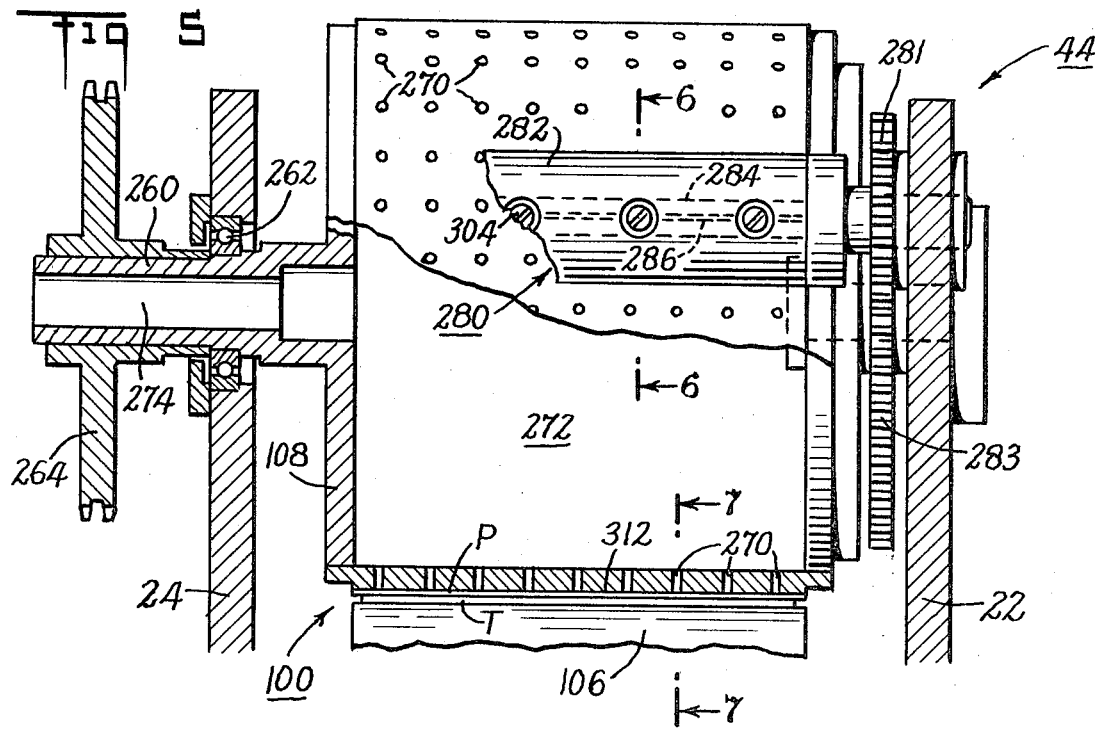
FIG. 5 is a vertical, sectional view taken on line 5—5 of FIG. 2A showing the vacuum paper feed drum and paper cut off knife.

14—14 of FIG. 13 showing the stabilizing roll;

FIG. 15 is a vertical, sectional view taken on line 15—15 of FIG. 2B showing a stacking station; and FIG. 16 is a horizontal, plan view taken on line 16—16 of FIG. 2B showing the stacking station.

With reference now to FIG. 1, there is shown the adhesive and paper covering applying apparatus 20 including front side frame support members 22 and 24 and rear side frame support members 26 and 28, respectively, mounted on base support member 30. Laterally extending frame arm members 32 and 34 from side supports 22 and 24, respectively, and side support rails 36 and 38 which interconnect side supports 22 to 26 and 24 to 28, respectively, provide a rigid frame support for the various operating stations and drive rolls.

Broadly, the adhesive applying apparatus of the present invention includes a vertically stacked tile feeding hopper 40 which feeds the tiles one at a time to a feed or transfer conveyor 42. Feed conveyor 42 passes the tiles to the adhesive and paper applying station 44 from whence they are transmitted to a stacking and aligning station 46. The specific sequence of operations and operative steps performed on the tile as it is moving through the machine will now be explained in more detail.

With reference first to FIG. 2A, it is seen that the tiles T from a stack 48 are moved into a hopper 40 where the tiles are maintained in vertical alignment against the hopper front wall 50. From hopper 40 the tiles are removed one at a time from the bottom of the stack by transfer conveyor 42. With reference to FIGS. 3 and 4 as well, it is seen that transfer conveyor 42 includes a plurality of individual slat sections 54 which are mounted at each end to drive chains 56. Drive chains 56 are endless chains and are mounted to pass over drive sprockets 58 and idler sprockets 60. The drive sprockets 58 and idler sprockets 60 are suitably journaled in side extension members 32 and 34. A suitable power takeoff (not shown) from motor 62 drives the drive sprockets 58 and, hence, through chains 56 the conveyor 42.

The slats 54 of the transfer conveyor 42 rest on and slide along three spaced guideways 64, 66 and 68 when the slats are traveling along the upper run of the conveyor so that the slats are continuously supported on the guideways.

From FIGS. 3, 4 and 7, it is apparent that certain ones of conveyor slats 54 include an upstanding narrow pusher flight 70 which engages the trailing edge of a tile T and carries the tile along as conveyor 42 is moving. The spacing of successive pusher flights 70 is slightly greater than the side-to-side dimension of a square tile so that these tiles follow one another through the machine with a very small gap between their adjacent trailing and leading flush with the level of the tile supporting surface of slats having the pusher flight 70 includes three recessed portions 72 which accommodate an extending finger 74 suitably attached, as by screws 76, in a recessed portion 78 in the next adjacent slat. The recessed portion 72 is so dimensioned such that when the slats are running along the flat part of the upper conveyor run the fingers 74 are flush with the level of theti le supporting surface of slats 54. The purpose of the fingers 74 will be explained more fully hereinbelow.

Referring now again to FIG. 2A, it is seen that as the pusher flight 70 moves so as to contact the lowest tile T in a stack of tiles 80 in hopper 40, the pusher flight 70 contacts the trailing edge of a tile and carries it out of the hopper. Since floor tiles of the type to be used in the present invention vary in thickness from, for example, 1/16 of an inch to 1/8 of an inch it is necessary to have a blocking gate at the leading edge of the hopper 40 so that only one tile can be drawn from beneath the stack by the pusher flight 70. Accordingly, an adjustable blocking gate 82 (see FIG. 3) is provided at the lower portion of hopper wall 50 with an adjusting means, i.e. screws 84 in slots 86 to vary the elevation of the bottom edge 88 of the gate above the conveyor bed level so that only one tile is transported by the transfer conveyor 42.

Since the tiles are relatively light and the conveyor 42 is moving relatively rapidly, there is a tendency, absent a countermanding force, for the tiles to lift off the conveyor causing jamming and misalignment when they are transferred to the laminating station. Accordingly, a suction is provided through a vacuum box 90 mounted beneath the upper run of the conveyor 42. Suction from a hose 92 communicating with a suction housing 94 is dispersed along the hollow underside of the upper run of conveyor 42 by the vacuum box 90. Hence, a slight vacuum is created on the underside of the upper conveyor run tending to maintain the tiles relatively flat and flush against the slats 54 of the conveyor. In addition to the suction applied through suction box 90, there is disposed at each side of the conveyor run, near the end of the upper run, side guards 96 urged by a spring tensioning member 98 which contacts the opposed outside edges of the tiles and maintains them flush against the conveyor run.

With reference now to FIGS. 2A and 7, there is shown the manner in which each tile is transferred from the transfer conveyor section 42 to the laminating station 100 as conveyor section 42 passes around drive sprockets 58. As each indvidual tile advances under the influence of the flight bar 70, the forward end of the tile continues in a substantially horizontal plane and contacts the leading edge 102 of a tile support bed 104. The bed 104 has a flat upper surface to allow the tile to slide thereon. The transfer to support bed 104 is made close to the end of the upper conveyor run of conveyor 42 and the leading edge 102 of bed 104 is spaced from conveyor 42 so that when the leading edge of the tile T being transferred contacts the support bed 104 it is still partially supported by the conveyor slats 54. In this manner the tiles are maintained at an essentially horizontal orientation during transfer to bed 104.

When the pusher flight 70, in contact with the rear edge of the tile being transferred, approaches the end of the upper conveyor run, the supporting slats of the conveyor 42 progressively disengage from contact with the underside of the tile as they follow the guide chain 56 around sprocket 58. When a tile on conveyor 42 has reached the position shown in FIG. 7, the support fingers 74 are raised from their recesses 72 by the radial movement to which the supporting slats are subjected and, hence, the fingers 74 lift the rear edge of the tile clear from contact with the pusher flight 70. Thus, the tendency of the pusher flight to linger in contact with the rear edge of the tile and cause misalignment, or bending of the tile is eliminated. When the tile has reached the position shown in FIG 7, the forward end of the tile has already contacted the laminating roll and its forward motion is now dictated by rotary motion of the laminating roll and thus movement of the tile is not dependent on maintaining continuing contact with the pusher flight 70.

The laminating station 100 is the station where sheets of covering paper having an adhesive coating bonded thereto in a predetermined pattern are laminated to the tiles as they are passed between an idler opposition roll 106 and the driven laminating roll 108. The distance between the rolls 106 and 108 can be adjusted by an adjustment mechanism 110 (FIG. 1) to vary the distance for various thickness tiles and also to adjust the laminating pressure on the tiles. A hold-down plate 112 pivotally mounted, as at 114, to a support rod 116 connected to the machine frame 24 exerts a slight retaining pressure on the tiles as they are passed to and between the laminating rolls 106 and 108.

The paper used to cover the tile and which is subsequently peeled away when the tile is installed is stored in a continuous roll 116 (FIG. 2B) mounted on a shaft 118 and journaled in side frames 26 and 28 of the machine frame. A spare roll 120 shown in phantom line in FIG. 2B may be stored on an auxiliary shaft 122 in extension side frame members 126 and 128 so that should a roll of paper become exhausted during a production run the roll of paper can be manually moved from the auxiliary station 120 to the working station 116 and the leading edge of the new roll may be joined to the trailing edge of the old roll on a bonding platform 130 directly in front of the paper roll station.

The paper travel is guided from the roll 116 under an initial idler roller 132 over a second idler roll 134 which is rotatably mounted on pivot arms 136 pivotally secured, as at 138, to the machine frame; around a driving roll 140; and over a third idler roll 142 which is rotatably mounted on pivot arm 144 pivotally mounted, as at 146, to the machine frame. The paper is then guided under a tensioning roll 150 which is pivotally secured by lateral support arms 152 at pivot point 154 to the machine frame so that the weight of roller 150 creates a tensioning force in the paper as it passes over the various idler and drive rolls. After passing under the tensioning roll 105, the paper is guided over a stabilizing roll 156 and thence under an idler roll 158 and then over a "Mount Hope" roll 160 through the adhesive applying station 162 and over the laminating roll 108.

The laminating roll 108, which is driven at a synchronous speed to the speed of the paper travel, has associated with it a knife roll 282 which is designed to rotate as the laminating roll 108 rotates and thus slice the continuous sheet of paper into appropriately sized sheets to fit over the tiles. Specific details of construction of the adhesive applying station and the laminating station will now be set forth, as well as details of the paper travel through the various idler and drive rolls. In all descriptions, it is to be understood that all of the various rolls are suitably journaled, in a conventional manner, for rotation in the machine frame and such details will be omitted in the specific description for clarity.

The paper in roll 116 comprises what is conventionally referred to as "relase paper." The paper may be a standard thin paper treated with a release agent, such as silicone, on one side thereof so that the adhesive while initially adhering to the treated side of the paper, will after the adhesive is bonded to the tile separate more readily from the paper than it does from the tile. Alternatively, the treated paper may be replaced by sheets or films of material such as Mylar, Teflon, polyethylene, polypropylene, or the like from which the adhesive will readily separate. Thus, the term "paper" as used in this specification and claims is intended to refer to and include such other synthetic films as various mixtures of cellulosic materials and resins, as well as ordinary paper coated with a release composition. The width of the paper is selected such that it exceeds the width of a tile being processed through the machine, for example, by an eighth of an inch thereby to give a 1/16 inch overlap on each side of the tile. As an illustration, where twelve-inch square tiles are being processed through the machine the paper width will be 12 1/8 inches and when centered over a tile there will be a 1/16 inch overlap on parallel opposed edges of the tile.

With reference to FIG. 11, it is seen that the working paper roll 116 is journaled to rotate between opposed friction shoes 170 and 172 which are pivotally connected as at 174 and 176, respectively, to a pair of bell crank arms 178 and 180. The bell crank arms are in turn pivotally connected at their elbows 182 and 184, respectively, by pivot connections 186 and 188 mounted on the machine frame. The other end of the bell crank arms 178 and 180 are pivotally connected as at 190 and 192, respectively, to extending piston arms 194 and 196 of air cylinders 198 and 200 mounted on the machine side frames 26 and 28, respectively. The mounting may be, for example, rigid bracket extensions 202 and 204. By controlling the air supply to cylinders 198 and 200 thereby to control the extension of the piston rods 194 and 196, frictional pressure on the shoes 170 and 172 on either side of the paper roll 116 is exerted and as the paper is unrolled during continuous operation this friction presure creates the proper drag resistance to the unrolling of the paper to assure a smooth and continuous controlled unrolling of the paper without unwanted acceleration due to inertial effects of the rotating heavy paper roll.

As seen more clearly in FIG. 14, the weighted tensioning roll 150 also serves as an added tensioning factor to preclude unwanted discontinuities in the uniform speed of unrolling and also to assure the proper tension as the roll 116 is unwound.

After passing under the tensioning roll 150, the paper passes over a stabilizing roll 156 where, if desired or found necessary due to the type of "paper" used in the operation, an additional paper treating step may be accomplished. Roll 156 is perforated as at 210 and a circumferential sleeve around the axis 212 of stabilizing roller 156 includes a concentric sleeve 214 including an inlet 216 to admit desired stabilizing agents.

With reference also to FIG. 1, it is seen that manual adjustment means, i.e. adjustment knobs 220 and 222 which function through a gear mechanism are provided to change the orientation of the idler rolls if such an adjustment is found desirable. Also, the paper position of roll 116 is adjustable both vertically and horizontally to secure proper alignment by adjustment wheels 224 and 226, respectively.

After the paper passes under tensioning roll 158 it passes over the "Mount Hope" roll 160 under controlled tension conditions and as seen in FIG. 12 the "Mount Hope" roll 160 consists of a nonlinear axis roller element 220 suitably journaled in the side frames 22 and 24 of the machine. The roll 220 is angled inwardly from each end to a mid point 221 and, as the paper passes over this roll under controlled tension, any creases in the paper are spread outwardly from the middle of the roll 220 outwardly toward each end. Thus, after passing over the "Mount Hope" roll 160 the paper is properly tensioned and substantially wrinkle free and flat. The paper then passes into the adhesive applying station 162.

At the adhesive applying station, molten adhesive from a heated adhesive storage box 230 is allowed to flow into an adhesive transfer drum 232 where the level of the liquid adhesive is controlled so that, as the adhesive applicating roll 234 is rotated, the adhesive applicating roll comes into contact with the molten adhesive in drum 232. Thus, a controlled amount of the adhesive is retained by roll 234 for ultimate transfer to the paper.

As seen in FIGS. 9 and 10, the adhesive application station 162 includes a driven adhesive application roll 234 having a circumference which is preselected according to the size of the tile being processed through the machine. As an example, when twelve-inch square tiles are being processed, it is desired to provide an adhesive coating on the backside of the tiles such that a border on the order of 1/16 of an inch around the perimeter of the tile is left with no adhesive coating. This non-adhesive coated border facilitates the installation of the tile since, when the release paper is peeled away to expose the adhesive coating on the tile, the tile may be supported at an angle on an uncoated edge and precisely aligned in its proper position and then allowed to fall into place so that the adhesive coating is in contact with the floor to which the tile is being applied. This non-adhesive coated border also prevents undesired bleeding or oozing of any adhesive between the cracks of adjacent tiles after the floor has been installed. The adhesive that is applied to the tile is a sufficient amount to securely retain the floor tile in intimate contact with the floor after installation.

Accordingly, the adhesive application roll has an adhesive absorption face 236 which is dimensioned as to width and circumference such that only the desired area of the paper is impregnated with the molten adhesive. Thus, for the example of a twelve-inch square tile, the width of the adhesive adsorbing face 236 would be 11 7/8 inches and similarly the circumference of the adhesive adsorbing surface 236 would also be 11⅞ inches. The adhesive adsorbing surface 236 is a knurled facing on the roll 234 with a space 238 of, for the example of the twelve-inch tile, ¼ of an inch to allow for the ⅟₁₆ inch non-adhesive coated border at the leading edge and trailing edge of the tile and also for a ⅟₁₆ inch paper overlap over the leading and trailing edge of the tile. Thus, while the circumference of the roll 234 is 12¼ inches, the spacing is ¼ inch so that only 11⅞ inches of the total circumference of the roll will pick up adhesive and transfer adhesive to the paper.

As seen in FIG. 10, the hot molten adhesive is fed into the adhesive transfer drum 232 through an adhesive inlet nozzle 233 and feed spout 235 into the drum. The drum is sealed as at 237 against the adhesive transfer roll 234 and the level of adhesive in the drum 232 is maintained so that sufficient adhesive is transferred to the surface 236 to insure complete wetting of the paper when the surface 236 is pressed against the paper by the pressure of opposition roll 240.

The adhesive is transferred to the paper as the paper passes between the adhesive transfer roll 234 and an opposition roll 240 which is rotatably mounted in bearing members 242 and 244 slidably secured to the side frame members 22 and 24, respectively.

Rigidly secured to the side frame members 22 and 24, respectively, are air cylinders 246 and 248 which have air piston members 250 and 252 to pneumatically urge opposition roll 240 upwardly against adhesive application roll 234 and thus control the contacting pressure between rolls 234 and 240 as the paper is driven therethrough.

After the adhesive has been applied to the paper in the predetermined pattern, the paper passes over the driven laminating roll 108. Roll 108 (see FIG. 5) includes a hollow shaft 260 which is journaled within side frames 22 and 24, for example by bearing 262 so that it is freely rotatable therein.

The laminating roll 108 and adhesive application roll are synchronously driven for example by a geared drive sprocket 264 keyed to an extension of shaft 260 which drives a chain 266 (FIG. 1) and a drive sprocket 268 on the other end of a shaft (not shown) rotatably supported in a pillow block 270 on the machine frame. The other end of the shaft in pillow block 270 includes a gear 271 which meshes with a driving gear 254 mounted on shaft 255 of roll 234. Thus the ratio of revolutions that the laminating roll 108 makes with respect to the revolutions that the adhesive application roll 234 makes is directly related to the size of the gears 264 and 254 and, hence, a synchronized rotation can be kept between these two paper feed rolls.

Figure 6:
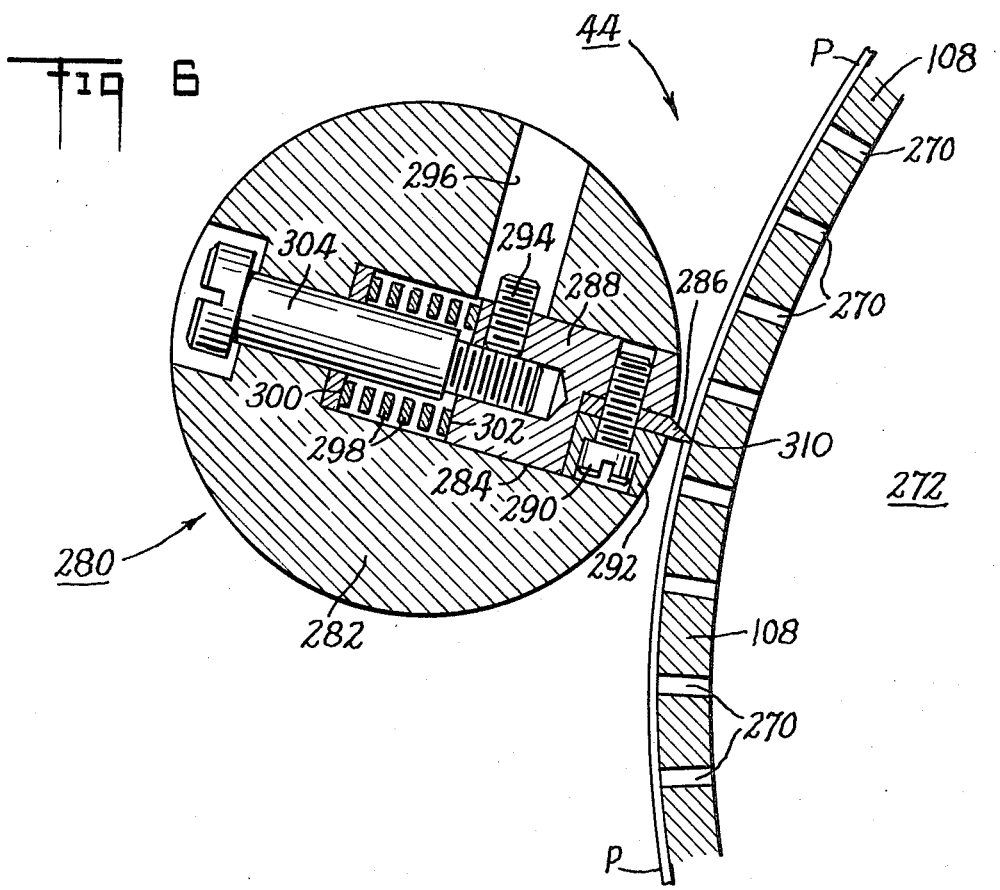
FIG. 6 is a vertical section taken on line 6—6 of FIG. 5 showing the rotary knife.

The laminating roll 108 includes a perforated surface, as at 270, so that there is fluid communication between the outer surface of the drum and the hollow interior 272 (see FIG. 6). The central supporting shaft 260 is also perforated within the confines of the drum itself to allow a suction pressure, supplied externally through the hollow interior 274 of support shaft 260, to draw the paper as it is passed over the roll 108 firmly against the outer surface of the roll, thus insuring a positive contact along the whole surface of contact between the paper and the roll.

At this point in the process, the protective covering sheet of material is still in a continuous length and has been impregnated on the paper with adhesive coating in a predetermined pattern. Prior to the paper contacting the underside of a tile it is cut into the appropriate lengths to completely cover the tile with, for example ⅟₁₆ of an inch overlap at the leading edge and trailing edge of the tile. For this purpose, a rotating knife assembly 280 (FIG. 6) is provided. The knife assembly 280 is contained in a roller element 282 suitably journaled for rotation within the side frame members 22 and 24 and positioned such that the roller element 282 is spaced slightly from the laminating roll 108. A gear 281 on the shaft of roller 280 meshes with a gear 283 driven by the rotation of laminating roll 108 so that as drum 108 rotates it causes the drum 282 to rotate also. The drum 282 which is circular in cross section has a longitudinal slot 284 housing a knife cutting edge 286 which is slightly longer in length than the width of the paper being processed through the machine. The knife blade 286 is retained in a holding block 288 by means of a threaded fastener member 290 threaded through a bearing block 292 through the blade 286 and into a holding block 288. Both the bearing block 292 and holding block 288 are dimensioned for sliding fit within the slot 284 and have a radiused outer surface to conform with the radius of the knife holding roller 282. The blocks 288 and 292 are retained within the roller 282 by set screws 294 which are installed through a suitable opening 296 in the roller. A compression spring 298 has one end seated against the rear surface 300 of the groove 284 and its other end against the rear surface 302 of the bearing block 288 and, hence, urges the assembly radially outward and forces the knife edge 286 against the surface of the laminating roll 108. An adjustment screw 304 threadedly engages the block 288 to vary the protrusion of the knife blade 286 from the outer surface of the roll 282. The circumference of the knife roll 282 is selected such that during the rotative cycle of the knife roll 282 the blade edge 286 makes one complete revolution during the time that the preselected length of the paper on the transfer roll 108 passes the cut off point 310. Hence, for the example given as illustrative herein, i.e. a twelve-inch tile, the circumference of the roll would be 12⅛ inches thereby cutting a length of paper from the roll which is 12⅛ inches long to allow for a ⅟₁₆ overlap at the leading and trailing edge of the tile. Thus, as roll 108 forces the rotation of the knife roll, the knife at each revolution comes into contact with the paper on the roll 108 and, as the knife is spring urged outwardly, the knife cuts the appropriate length paper segment. The paper remains on the roll due to the suction pressure through the openings 270 until the paper comes into contact with the tile at the paper transfer station 312. The rotative cycle of the roll 108 and knife assembly 280 are synchronized with the adhesive application roll 234 such that the paper is cut off midway between adjacent adhesive patches in the paper. Further, the knife roll 282 is treated with a surface coating which does not pick up any adhesive.

At the paper transfer station 312, the internal suction pressure is blocked thus releasing the paper from the roll and as the tile is passed between the opposition roll 106 and the laminating roll 108 the exposed adhesive surface of the paper contacts the tile passing between these rolls and the paper adheres to the surface of the tile. A tile passing between rolls 106 and 108 is under positive control of the rotative movement of roll 108 and, hence, is forced between the rolls causing the adhesive coated paper to adhere to the surface of the tile. The tile is then moved onto a belt takeoff conveyor 314 which includes a belt 316 which is mounted to pass over drive sprocket 318 and idler sprocket 320. A lower tensioning sprocket 322 is also provided along the lower run of belt 316. Belt 316 is, of course, running at a higher rate of speed than either the transfer conveyor 42 or the roll 108. Hence, a wider spacing between adjacent tiles is now maintained by the takeoff conveyor 314. The tiles are now withdrawn by conveyor 314 to stacking station 46 where the tiles are collected and stacked preparatory to their being boxed for shipment.

With reference to FIG. 8, there is shown a tile T as it is prepared after the adhesive and paper coating have been applied. The paper covering P, due to the release agent on one surface, does not adhere to the adhesive coating C with the same affinity as the adhesive adheres to the surface of the tile, hence, the adhesive is effectively transferred from the paper to the tile where it is firmly bonded. When the paper is peeled away the adhesive coating remains on the tile in the predetermined pattern, e.g. 1/16 inch set back, as at 340, from each edge of the tile. The paper itself has been selected such that its width forms a 1/16 overlay, as at 342, over the side edges of the tile and is cut, as noted above, so that the leading edge and trailing edge of the tile are also overlayed, as at 344, by 1/16 of an inch. The paper overlay makes it relatively easy to peel away the paper when the tile is installed thus exposing the adhesive bonded to the undersurface of the tile.

The tiles are carried by the takeoff conveyor 314 to the stacking station 46 and are passed initially through spaced idler rolls 350 and 352 to a stacking bin 354 (see FIG. 15). The stacking bin 354 includes side walls 356 and 358, which are secured to machine side frames 26 and 28, respectively, in any convenient manner. The stacking bin 354 includes a top portion 360 with an end wall 362 to stop the forward advance of the tiles T as they are passed into the stacking bin 354. Upper tile support plates 364 and 366, are disposed in slots 368 and 370 in side plates 356 and 358, respectively, and are slidably disposed therein so that plates 364 and 366 may be selectively advanced into, and retracted from, the interior of stacking bin 354. Immediately below sliding plates 364 and 366 are lower tile support plates 372 and 374 which are slidably disposed in slots 376 and 378 in side plates 356 and 358, respectively. The two sets of sliding plates are interconnected such that when the two upper plates 364 and 366 are in the retracted position (shown in full line in FIG. 15) then the two lower plates 372 and 374 are in extended position extending into the interior of the stacking bin 354 thereby to support a stack of, for example, four to eight tiles. When the lower set of plates 372 and 374 retract, a stack of tiles resting thereon are dropped into the lower portion 380 of the stacking bin 354 where the tiles are vertically aligned, in a manner explained more fully hereinbelow. The upper set of plates 364 and 366 are then advanced into the stacking station to receive another stack of four to eight tiles. Upper plate 364 and lower plate 374 are rigidly secured to each other such that when plate 364 advances to the right, as viewed in FIG. 15, plate 374 also advances to the right. Similarly, upper plate 366 and lower plate 372 are rigidly secured to each other so that, in like manner, when upper plate 366 moves to the left lower plate 372 also moves to the left. A rack 382 is rigidly secured to an extension of plate 364 and is positioned so that the teeth of the rack mesh and engage with a pinion 384 mounted for reciprocal rotative movement on a shaft 386. In like manner, a rack 388 is rigidly secured to an extension of plate 372 and also meshes with pinion 384. Thus, when pinion 384 is rotated in one direction, for example clockwise as viewed in FIG. 15, rack 382 is driven to the right thereby driving plate 364 and plate 374 to the right. This will retract plate 364 from within the stacking pin 354 while simultaneously extending plate 374 from without the stacking bin to the full line position shown in FIG. 15. Simultaneously rack 388 will be driven to the left causing plate 366 to retract and causing plate 372 to extend into the stacking bin 354. In operation, both plate 364 and 366 are initially in extended position such that a plurality of tiles, for example four to eight, are allowed to be fed into the bin by conveyor 314 and are initially stacked on plates 366 and 364. When pinion 384 is rotated, plates 364 and 366 retract allowing the stack of tiles to drop and these tiles are in turn retained by the extending plates 372 and 374. During the next cycle of operation as plates 372 and 374 retract the tiles stacked thereon are allowed to drop into the lower portion of the stacking bin.

With reference to FIG. 16 as well, it is seen that the tiles T are allowed to build up in the stacking bin to a level of, for example twelve to twenty-four tiles, and are supported on longitudinally extending guide members 390 therein. The tiles are aligned in the lower portion 380 of the stacking bin 354 by means of pusher plates 392 which are secured to the shaft 394 of an air cylinder 396 mounted on the machine frame. Plates 392 push on the trailing edges of a stack of tiles and cause the leading edges of the tiles to abut against plates 400 extending into the stacking bin 354. As seen in FIG. 16, plates 400 are pivotally secured as at 402 to a pair of brackets 404 mounted respectively on the exterior surface of side plates 356 and 358. A bell crank arm 406 is rigidly secured to an edge 408 of plate 400 and pivotally secured as at 410 to a piston 412 of air cylinder 414. The air cylinder 414 is rigidly secured as by a bracket 416 on the exterior faces of side plates 356 and 358 respectively. Thus, it is seen that when piston 412 is retracted, plates 400 are swung away from and out of the path of the stack of tiles. In operation, the tiles are stacked in increments of, for example four to eight tiles in the lower portion 380 of the stacking bin 354 and cylinder 396 is actuated causing pusher plates 392 to move into contact with the trailing edge of the stack T of tiles. Air cylinders 414 are actuated causing piston 412 to extend and pivot plates 400 into the path of the tiles T. The tiles are forced by plates 392 against the extending plates 400 bringing the leading and trailing edges of the stack into vertical alignment and then cylinder 414 is actuated to retract piston 412 causing plates 400 to move out of the path of the stack of tiles. Piston 394 extends further carrying the stack along the guideways 390 over idler roll 420 to a power driven roller conveyor section 422 which carries the stack of tiles out of the stacking bin 354 and against a stop plate 424. Stop plate 424 is secured to a piston 428 of air cylinder 430 and when cylinder 430 is actuated causing piston 428 to retract the blocking gate 424 retracts below the level of the roller conveyor 422 allowing the power takeoff conveyor 422 to move the stack of tiles to a wrapping station where the tiles are boxed for shipment.

It is thus seen that the apparatus and method of the present invention provides a rapid and economical method to prepare peel and stick tiles. It should be noted that the apparatus of this invention may be utilized to apply adhesive to and a protective sheet over the adhesive to any relatively rigid rectangular product having one flat surface to which the adhesive and protective sheet are to be applied. Thus the utility of this apparatus is not limited to tile products. Those skilled in the art will readily note that, with certain modifications in the conveying and cutting apparatus the method and apparatus disclosed herein can be used to produce many different adhesive-backed products.

What is claimed is:

1. Apparatus for the production of adhesive-backed products covered by a protective paper sheet comprising:
   conveyor means for advancing said products serially with a flat surface of said products in a common plane,
   a laminating roll positioned transversely above said plane and substantially tangent thereto,
   means to rotate said roll at the same peripheral speed as the speed of said conveyor,
   an adhesive application station to coat said paper sheet with adhesive before said paper sheet reaches said laminating roll,
   said adhesive application station including means to selectively coat portions of said paper sheet with adhesive whereby the surface area of said selectively coated areas is less than the area of said surface of said products,
   means for guiding said adhesive-coated continuous paper sheet to said laminating roll,
   means operatively associated with said laminating roll to periodically sever said paper sheet into discrete paper segments while said sheet is maintained in intimate contact with said laminating roll, and
   means to transfer said discrete paper segments to said surface of said products to bond said segments thereto.

2. Apparatus as defined in claim 1 wherein said laminating roll includes means to maintain said paper sheet and said paper segments in intimate contact with the peripheral surface of said roll until said discrete paper segments are brought into contact with said products.

3. Apparatus as defined in claim 2 wherein said means to maintain said paper sheet and said paper segments in intimate contact with said roll comprises a perforated peripheral surface on said roll and evacuating means mounted within said roll thereby to provide a suction which acts to pull said paper and paper segments against the outer surface of the roll.

4. Apparatus as defined in claim 3 wherein said roll includes means within said roll to block the suction effect when paper segments adhering to the outer surface of the roll contacts the surface of a tile product thereby to facilitate the transfer of said paper segment from said roll to said tile product.

5. Apparatus as defined in claim 1 wherein an opposition roll is positioned below said laminating roll and spaced therefrom a distance equal to or less than the thickness of a product thereby to provide a sufficient rolling contact pressure to effectively transfer said adhesive-coated paper segments to said surface and bond said segments to said products.

6. Apparatus as defined in claim 5 wherein said opposition roll includes means to adjust its position relative to the position of said laminating roll thereby to accommodate products of varying thickness.

7. Apparatus as defined in claim 1 wherein said means to sever said paper sheet includes a roller member having a longitudinal slot therein,
a knife member having a cutting edge housed in said slot,
said roller member including means to synchronize rotation of said roller to the rotation of said laminating roll,
said roller member being positioned with respect to said laminating roll such that upon synchronous rotation of said roller member and said laminating roll said knife edge is brought into periodic contact with said paper sheet to sever said sheet into said discrete paper segments.

8. Apparatus as defined in claim 7 wherein said roller member is geared to said laminating roll, whereby as said laminating roll is rotated rotary motion is transferred from said laminating roll to said roller member, said knife member being resiliently housed in said roller member so that as said knife member is brought into contact with said paper on said laminating roll said knife is resiliently urged against said paper thereby severing said paper into said segments.

9. An apparatus for the production of an adhesive-backed product covered by a protective paper sheet comprising:
means for supplying a continuous web of protective paper from a roll of paper including a plurality of paper drive rolls and paper tensioning rolls,
said drive rolls adapted to move said web continuously at a uniform rate of speed,
an adhesive applicator adapted to apply adhesive to one side of said continuously moving web of paper,
said adhesive applicator comprising a housing to hold a supply of molten adhesive including an opening on one side thereof,
an adhesive application roll having a peripheral surface thereon which has an affinity for said molten adhesive,
said adhesive application roll being positioned to rotate contiguous said opening thereby to contact said molten adhesive in said housing,
means to rotate said adhesive application roll thereby exposing said peripheral surface to said adhesive and cause said adhesive to adhere to said surface,
said adhesive application roll being positioned so as to maintain rolling contact with said web of paper thereby to transfer adhesive adhering to said surface to said web,
said peripheral surface on said adhesive application roll including a discontinuity thereon which has no affinity for said adhesive thereby to transfer adhesive to said web of paper in discrete spaced patches,
means to sever said web of adhesive coated paper into segments of discrete length, and
means to transfer said discrete lengths of adhesive coated paper to a series of spaced tile products moving at a uniform rate of speed which is the same as the speed of movement of said paper.

10. Apparatus as defined in claim 9 wherein said means to transfer said discrete segments of adhesive-coated paper to said products comprises a rotatably mounted laminating roll having a peripheral surface,
said peripheral surface adapted to contact the nonadhesive side of said paper,
said laminating roll including means to maintain intimate contact between said peripheral surface and said paper until said paper is brought into contact with said product.

11. Apparatus as defined in claim 9 wherein said means to maintain said paper sheet and said paper segments in intimate contact with said roll comprises a perforated peripheral surface on said roll and evacuating means mounted within said roll thereby to provide a suction which acts to pull said paper and paper segments against the outer surface of the roll.

12. Apparatus as defined in claim 11 wherein said roll includes means within said roll to block the suction effect when paper segments adhering to the outer surface of the roll contacts the surface of a tile product thereby to facilitate the transfer of said paper segment from said roll to said tile product.

13. Apparatus as defined in claim 9 wherein said means to sever said web of paper is synchronized with the adhesive applicator thereby to sever said paper between said patches of adhesive.

14. Apparatus as defined in claim 9 wherein the width of said peripheral surface is less than the width of said web of paper wherein when said adhesive is transferred to said web said adhesive patch is spaced from each lateral edge of said web of paper.

References Cited
UNITED STATES PATENTS

| | | |
|---|---|---|
| 2,895,551 | 7/1959 | Anderson et al. |
| 3,159,521 | 12/1964 | Pechmann 156—568X |
| 3,255,067 | 7/1966 | Sontheim et al. 156—556X |

VERLIN R. PENDEGRASS, Primary Examiner

U.S. Cl. X.R.

156—568